(12) United States Patent
Lee

(10) Patent No.: US 6,615,607 B1
(45) Date of Patent: Sep. 9, 2003

(54) KIMCHI REFRIGERATORS

(75) Inventor: Sun-Gyou Lee, Kwangu (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/301,595

(22) Filed: Nov. 22, 2002

(30) Foreign Application Priority Data

Jun. 29, 2002 (KR) ........................................ 2002-37615

(51) Int. Cl.[7] .............................................. F25D 17/04
(52) U.S. Cl. ........................... 62/440; 62/457.1; 62/371
(58) Field of Search ....................... 62/440, 441, 457.1, 62/457.5, 458, 371; 220/4.27, 23.86

(56) References Cited

U.S. PATENT DOCUMENTS 5,337,581 A * 8/1994 Lott .............................. 62/264
5,409,126 A * 4/1995 DeMars ...................... 220/4.27
6,490,880 B1 * 12/2002 Walsh ........................ 62/457.9
2002/0194861 A1 * 12/2002 Shin ............................. 62/440

FOREIGN PATENT DOCUMENTS

KR 10-334652 12/2001

* cited by examiner

Primary Examiner—Melvin Jones

(57) ABSTRACT

A refrigerator which stores food having an ideal storage temperature range that is different from a predetermined storage temperature range of a storage compartment of the refrigerator. The refrigerator includes a cabinet which defines an appearance of the refrigerator, a storage compartment which is defined in the cabinet and has an opening, a door which selectively opens and closes the opening, and a storage container which is removably received in the storage compartment to store the food. The storage container has a double container structure and includes a box-shaped outer container part, a lid, and an inner container part. The outer container part defines an appearance of the storage container and has an opening. The lid selectively opens and closes the opening of the outer container part. The inner container part is removably set in the outer container part.

20 Claims, 6 Drawing Sheets

KIMCHI REFRIGERATORS

CROSS-REFERENCE TO RELATED APPLICATIONS

This application claims the benefit of Korean Patent Application No. 2002-37615 filed on Jun. 29, 2002, in the Korean Intellectual Property Office, the disclosure of which is incorporated herein by reference.

BACKGROUND OF THE INVENTION

1. Field of the Invention

The present invention relates to refrigerators, and more particularly, to a refrigerator which is provided with a storage container to receive and store food therein.

2. Description of the Related Art

Generally, a refrigerator generates cool air using an evaporator according to a refrigerating cycle, and supplies the cool air to a storage compartment to maintain the freshness of food stored in the storage compartment. A standard type refrigerator and a kimchi refrigerator are both refrigerating appliances.

A conventional refrigerator comprises a cabinet, a storage compartment and a door. The storage compartment is defined in the cabinet. The door is hinged to a portion of the cabinet to selectively open and close the storage compartment. The refrigerator further comprises electrical devices which perform a refrigerating cycle so as to supply cool air to the storage compartment.

FIG. 1 shows a storage container 1 which is provided in the conventional refrigerator. The storage container 1 has a box shape, and is open at a top to receive food therein. A lid 2 allows the open top of the storage container 1 to be closed. To store the food in the storage compartment of the refrigerator, the food is placed in the storage container 1, and the lid 2 is closed thereon.

However, the conventional refrigerator is provided so as to have the storage compartment maintain a predetermined storage temperature range. Accordingly, it is difficult to store various foods whose ideal storage temperature ranges are different from the predetermined storage temperature range in the storage compartment.

SUMMARY OF THE INVENTION

Accordingly, an aspect of the present invention is to provide a refrigerator which stores food having a storage temperature range that is different from a predetermined storage temperature range of a storage compartment.

Additional aspects and advantages of the invention will be set forth in part in the description which follows and, in part, will be obvious from the description, or may be learned by practice of the invention.

To achieve the above and/or other aspects of the present invention, there is provided a refrigerator comprising a cabinet which defines an appearance of the refrigerator, a storage compartment which is defined in the cabinet and has an opening, a door which selectively opens and closes the opening of the storage compartment, and a storage container which is removably received in the storage compartment and stores food, wherein the storage container has a double container structure and includes an outer container part which defines an appearance of the storage container and and has an opening, a lid which selectively opens and closes the opening of the outer container part, and an inner container part which is set in the outer container part.

The inner container part may be removably set in the outer container part.

The inner container part may have a lower heat-conductivity in comparison with the outer container part.

The inner container part may be sized smaller than the outer container part so as to form an air layer between the inner and outer container parts.

Hand insertion holes may be provided on corresponding sidewalls of the inner container part, so as to allow a user to easily take the inner container part out of the outer container part.

A plurality of discharging holes may be provided on a bottom plate which forms a bottom of the inner container part, so as to have water leaking from the food stored in the inner container part be discharged to the outer container part.

Projections may be formed on the bottom plate of the inner container part so as to be downwardly projected from areas around the discharging holes.

The outer container part may comprise a bottom plate, a sidewall which upwardly extends from the bottom plate of the outer container part, a rib which outwardly extends along an upper edge of the sidewall of the outer container part, handle mounting recesses formed on corresponding areas of the rib, handles mounted to the corresponding handle mounting recesses, and a sliding hole provided at each end of each of the handle mounting recesses Each of the handles may comprise a grip part which elastically deforms in response to an external force acting thereon, sliding parts which outwardly extend from corresponding ends of the grip part and slidably move along the corresponding sliding holes, and a stop part provided at an end of each of the sliding parts to prevent removal of the sliding parts from the respective sliding holes.

BRIEF DESCRIPTION OF THE DRAWINGS

These and other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
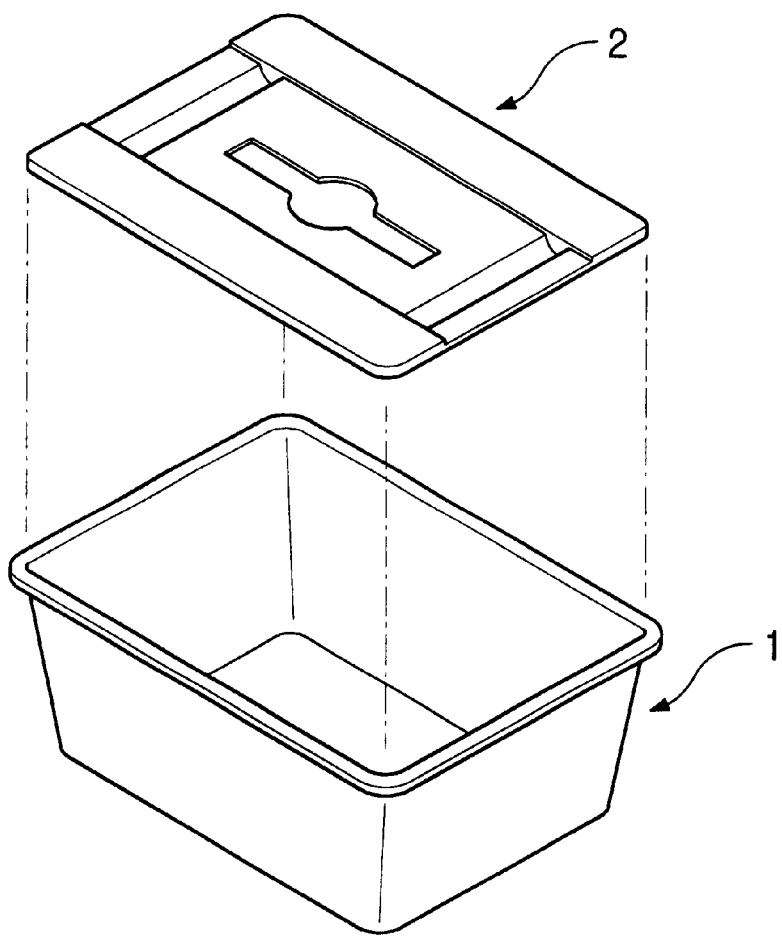
FIG. 1 is a perspective view of a storage container of a conventional refrigerator.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Although the present invention is described herein with reference to a kimchi refrigerator, it is understood that the present can be applied to other refrigerators as well.

Figure 2:
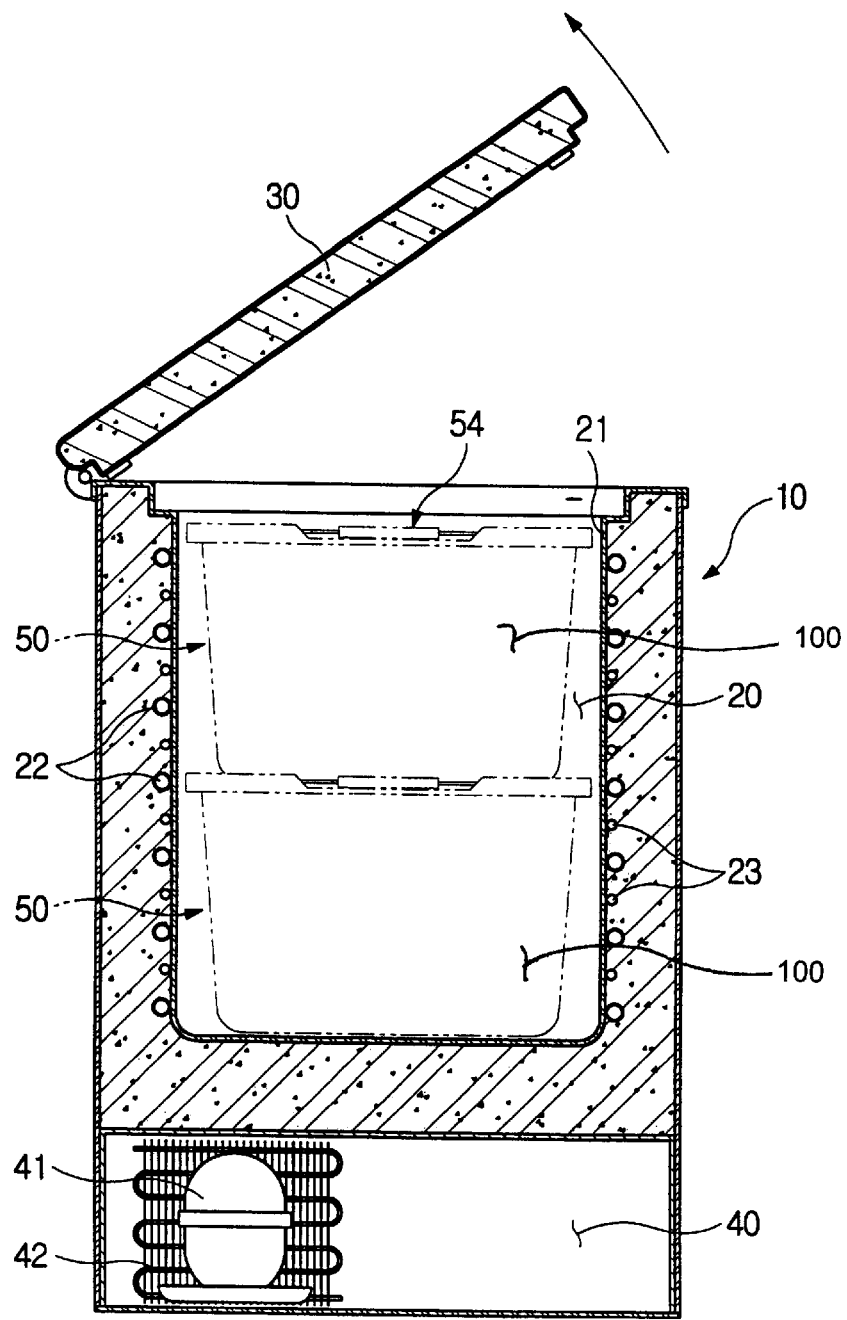
FIG. 2 is a sectional view illustrating the construction of a kimchi refrigerator according to the present invention.

FIG. 2 shows a kimchi refrigerator according to an embodiment of the present invention. The kimchi refrigerator comprises a cabinet 10 which defines an appearance of the kimchi refrigerator, a storage compartment 20 which is provided in the cabinet 10 and has an opening, and a door 30 which selectively opens and closes the opening of the storage compartment 20.

The kimchi refrigerator further comprises a cooling unit which cools the storage compartment 20, and a ripening unit which ripens food, for example, kimchi, stored in the storage compartment 20. In this case, the cooling unit is installed to surround a sidewall of a liner 21 which defines the storage compartment 20, and comprises a refrigerant pipe 22 which serves as an evaporating heat exchanger. The ripening unit is installed to surround an outer surface of the liner 22, and comprises an electric heating wire 23.

The kimchi refrigerator is provided on its lower portion with a machine room 40. The electrical devices including a capillary tube (not shown), a compressor 41, and a condensing heat-exchanger 42 are mounted in the machine room 40, and perform a refrigerating cycle along with the refrigerant pipe 22 which is installed on the liner 22.

The kimchi refrigerator further includes a storage container 100 which is removably set in the storage compartment 20 so as to separately store predetermined amounts of food, such as kimchi. The storage container 100 or one or more portions thereof may be made of a transparent material.

Figure 3:
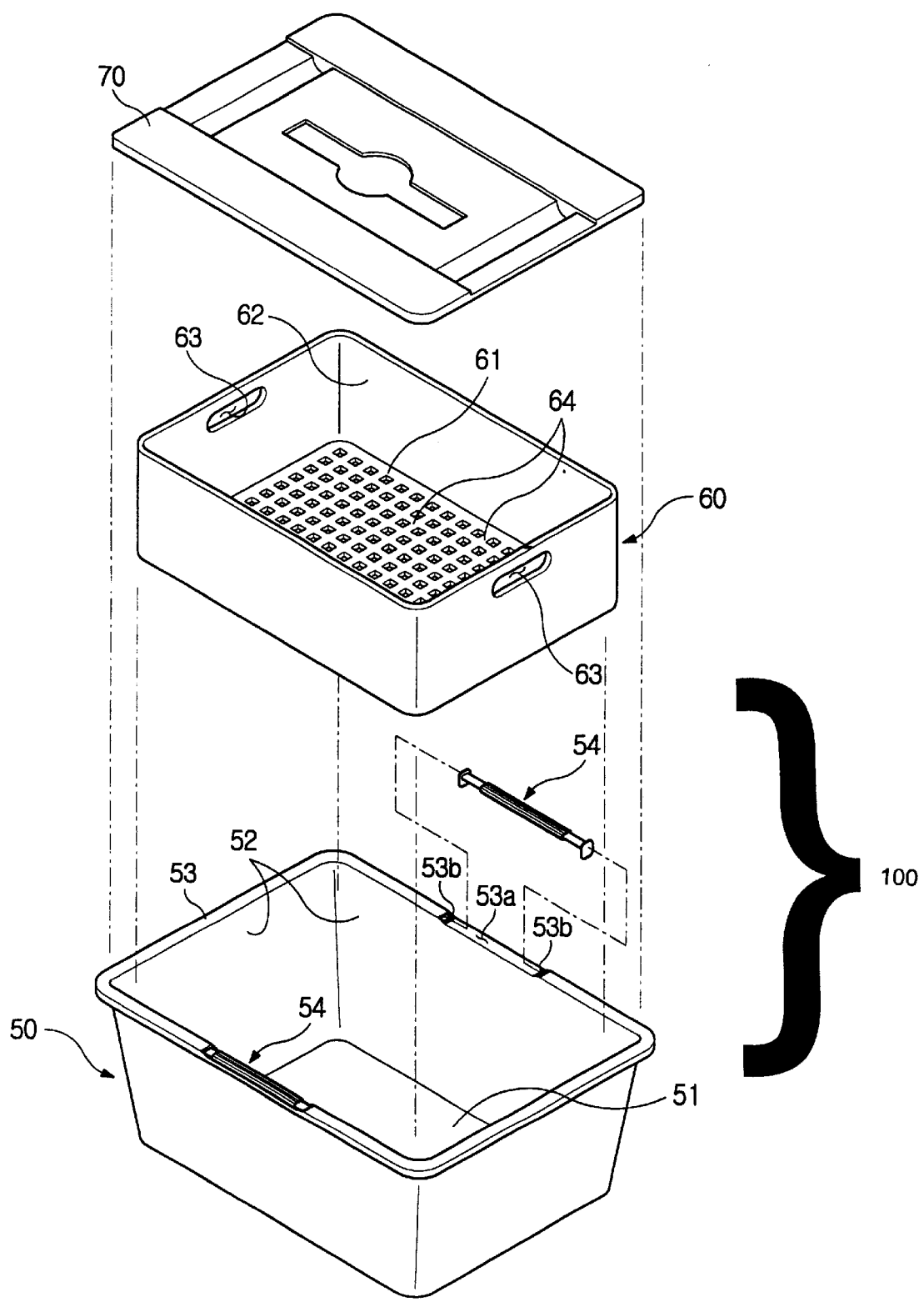
FIG. 3 is a exploded perspective view of a storage container of a refrigerator according to an embodiment of this invention.
Figure 4:
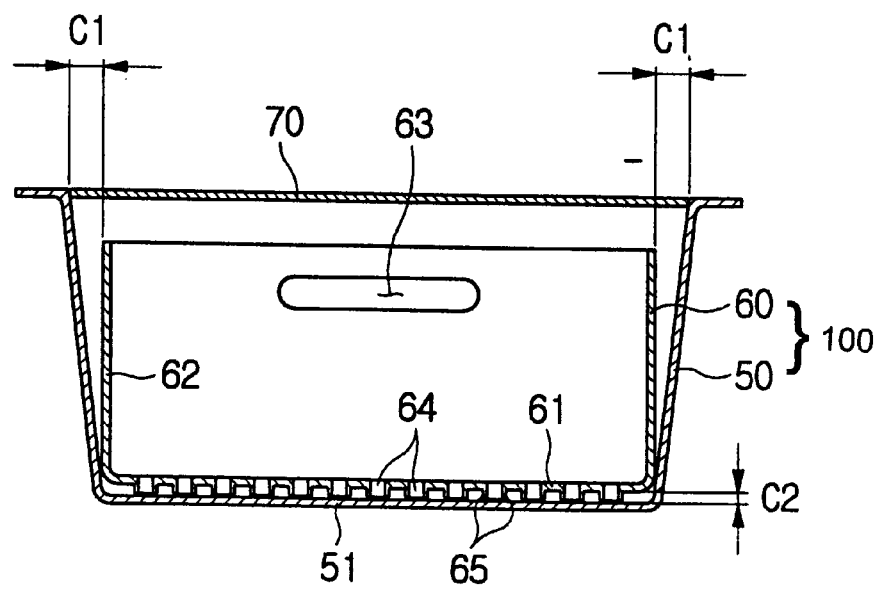
FIG. 4 is a side sectional view of the storage container shown in FIG. 3.

FIGS. 3 and 4 shows the storage container 100 of the kimchi refrigerator of FIG. 2. The storage container 100 has a double-container structure, and includes an outer container part 50 and an inner container part 60. The outer container part 50 has a box shape and is open at a top so as to receive the food. The inner container part 60 is removably set in the outer container part 50, and is spaced apart from the outer container part 50 by a predetermined interval C1 so as to form an air layer between the outer and inner container parts 50 and 60. The storage container 100 further includes a lid 70 which opens and closes the open top of the outer container part 50.

The outer container part 50 comprises a bottom plate 51 and a sidewall 52 so as to receive the food therein. The bottom plate 51 forms a bottom of the outer container part 50, and the sidewall 52 upwardly extends from the bottom plate 51.

A rib 53 outwardly extends from an upper edge of the sidewall 52 of the outer container part 50. Handles 54 to carry the outer container part 50 are installed in the rib 53. To install the handles 54 in the rib 53, handle mounting recesses 53a are formed on the rib 53 at corresponding positions. Two sliding holes 53b are provided at both ends of each handle mounting recess 53a, and receive both ends of each handle 54.

Figure 5:
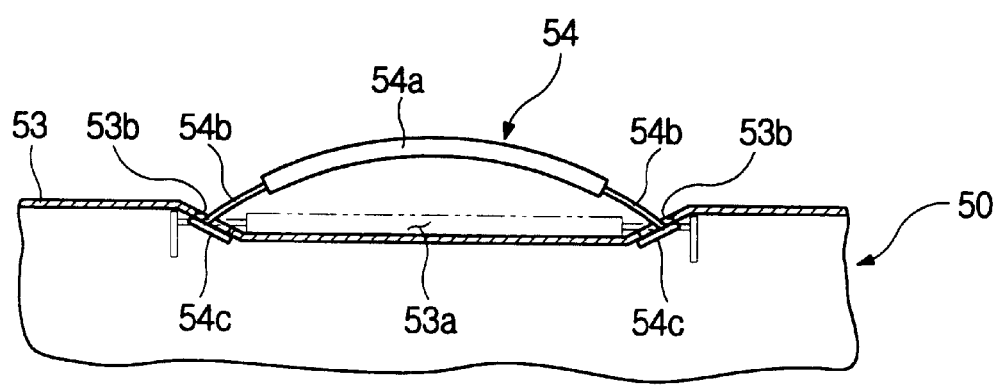
FIG. 5 is a sectional view illustrating a handle of the storage container shown in FIG. 3.

FIG. 5 shows the handle 54 of the storage container 100 of FIG. 3. The handle 54 comprises a grip part 54a, two sliding parts 54b, and two stop parts 54c. Where an external force is applied to the handle 54, the grip part 54a is elastically deformed to create, for example, an arc shape. The sliding parts 54b outwardly extend from both ends of the grip part 54a, and slidably move along the corresponding sliding holes 53b of the handle mounting recess 53a. Each of the stop parts 54c is provided at a corresponding end of the sliding parts 54b so as to prevent the sliding parts 54b from being unexpectedly removed from the corresponding sliding holes 53b. Normally, each handle 54 is in close contact with the corresponding handle mounting recess 53a of the outer container part 50. Where the external force is applied to the handle 54, the sliding parts 54b move along the sliding holes 53b while the handle 54 is bent to form the arc shape. Accordingly, a user can place his/her hand into a gap between the grip part 54a and the handle mounting recess 53a to grasp the grip part 54a.

Referring back to FIGS. 3 and 4, the inner container part 60 is removably set in the outer container part 50. The inner container part 60 comprises a bottom plate 61 and a sidewall 62. The sidewall 62 prevents the food lying on the bottom plate 61 from slipping out of the bottom plate 61. The inner container part 60 has a box shape which is open at a top, and may be manufactured using a plastic molding process so as to provide insulating qualities.

Where the inner container part 60 is set in the outer container part 50, the sidewall 62 of the inner container part 60 is spaced apart from the sidewall 52 of the outer container part 50 by a predetermined interval so as to form an air layer, that is, an insulating layer of air. The inner container part 60 is made of a material, for example, which has a lower heat conductivity than the outer container part 50.

Hand insertion holes 63 are provided on the sidewall 62 of the inner container part 60 at, for example, opposite positions, and are used to carry the inner container part 60. A plurality of discharging holes 64 are provided on the bottom plate 61 of the inner container part 60 so as to discharge water leaking from the food, for example, from vegetables or fruits, stored in the inner container part 60 to the outer container part 50 through the discharging holes 64. The areas around the discharging holes 64 form downward projections 65 which space the bottom plate 61 of the inner container part 60 apart from the bottom plate 51 of the outer container part 50 by a predetermined interval C2. Accordingly, an air layer is formed between the bottom plate 61 of the inner container part 60 and the bottom plate 51 of the outer container part 50.

Figure 6:
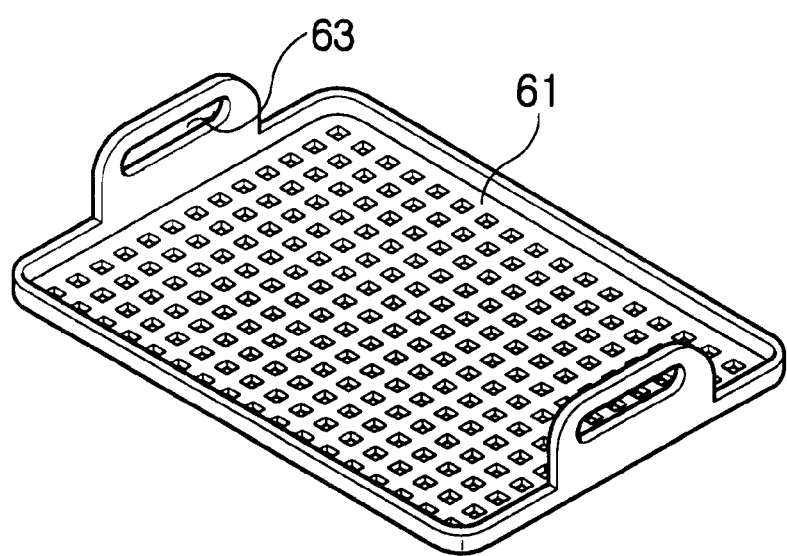
FIG. 6 is a perspective view of an inner container part of a storage container of a refrigerator according another embodiment of this invention.

FIG. 6 shows an inner container part 60 of the storage container 100 shown in FIG. 2 according to another embodiment of the present invention. As shown in FIG. 6, the inner container part 60 may be provided with a bottom plate 61 and hand insertion holes 63.

Although the present invention has been described with a reference to a kimchi refrigerator, it is understood that this invention may be applied to various kinds of cooling apparatuses which store food therein using a refrigerating cycle, and is not limited to the kimchi refrigerator.

An operation and effect of a kimchi refrigerator according to the present invention will be described with the reference to FIGS. 2 through 4.

The inner container part 60, which receives food therein, is placed into the outer container part 50. Thereafter, the outer container part 50 may be placed in the storage compartment 20 by utilizing the handles 54 which are provided on the outer container part 50.

Where the kimchi refrigerator begins an operation, cool air is generated by the refrigerant pipe 22 which is installed in the liner 21 of the storage compartment 20. Accordingly, a temperature of the storage compartment 20 is reduced until it reaches a preset temperature to store the food, for example, kimchi.

Since an air layer is formed between the outer container part 50 and the inner container part 60, an internal temperature of the storage container 100 is maintained to be higher than that of the storage compartment 20, due to an insulating effect of the air layer.

As described above, the present invention provides a refrigerator which has a storage container with a double container structure, including an outer container part and an inner container part which form an air layer therebetween. Accordingly, an inflow of cool air to food stored in the storage container is reduced. Therefore, an internal temperature of the storage container is maintained to be relatively higher than that of a storage compartment of the refrigerator, thereby allowing the food, which has an ideal storage temperature range higher than a predetermined storage temperature range of the storage compartment, to be stored in the storage container.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A refrigerator, comprising:
   a cabinet which defines an appearance of the refrigerator;
   a storage compartment which is defined in the cabinet and has an opening;
   a door which selectively opens and closes the opening of the storage compartment; and
   a storage container which is removably received in the storage compartment and stores food, wherein the storage container has a double container structure and includes:
      an outer container part which defines an appearance of the storage container and has an opening,
      a lid which selectively opens and closes the opening of the outer container part, and
      an inner container part which is set in the outer container part.

2. The refrigerator according to claim 1, wherein the inner container part is removably set in the outer container part.

3. The refrigerator according to claim 1, wherein the inner container part has a lower heat-conductivity than the outer container part.

4. The refrigerator according to claim 1, wherein the inner container part is sized smaller than the outer container part so as to form an air layer between the inner and outer container parts.

5. The refrigerator according to claim 1, wherein the inner container part includes one or more hand insertion holes which are provided on corresponding sidewalls of the inner container part.

6. The refrigerator according to claim 1, wherein:
   the inner container part comprises a bottom plate which forms a bottom of the inner container part, and
   the bottom plate includes a plurality of discharging holes so as to discharge water leaking from the food stored therein to the outer container part.

7. The refrigerator according to claim 6, wherein the bottom plate further includes projections which are formed on the bottom plate so as to project downward from areas around the discharging holes.

8. The refrigerator according to claim 1, wherein
   the outer container part comprises:
      a bottom plate,
      a sidewall which upwardly extends from the bottom plate of the outer container part,
      a rib which outwardly extends along an upper edge of the sidewall of the outer container part,
      handle mounting recesses formed on corresponding areas of the rib,
      handles mounted to the corresponding handle mounting recesses, and
      a sliding hole provided at each end of each of the handle mounting recesses; and
   each of the handles comprises:
      a grip part which elastically deforms in response to an external force acting thereon,
      sliding parts which outwardly extend from corresponding ends of the grip part and slidably move along the corresponding sliding holes, and
      a stop part provided at an end of each of the sliding parts to prevent removal of the sliding parts from the respective sliding holes.

9. The refrigerator according to claim 1, further comprising:
   a heating unit which heats the storage compartment and includes an electrical heating wire that surrounds a portion of an outer surface of the storage compartment, and
   a cooling unit which cools the storage compartment and includes:
      a compressor;
      a condensing heat-exchanger; and
      a refrigerant pipe which surrounds another portion of the outer surface of the storage compartment.

10. The refrigerator according to claim 9, wherein the refrigerator is a kimchi refrigerator.

11. The refrigerator according to claim 1, wherein the storage container has one or more portions made of a transparent material.

12. The refrigerator according to claim 1, wherein the storage container maintains a higher internal temperature than that of the storage compartment.

13. The refrigerator according to claim 1, wherein the outer container part has a box shape.

14. The refrigerator according to claim 1, wherein the outer container part includes one or more hand insertion holes which are provided on corresponding sidewalls of the outer container part.

15. The refrigerator according to claim 7, wherein the projections form an air layer between a bottom surface of the inner container part and an opposing surface of the outer container part.

16. The refrigerator according to claim 7, wherein the inner container part further comprises a sidewall which upwardly extends from the bottom plate of the inner container part.

17. A refrigerator, comprising:
   a cabinet which defines an appearance of the refrigerator;
   a storage compartment which is defined in the cabinet and has an opening;
   a door which opens and closes the opening of the storage compartment; and
   a storage container which is removably received in the storage compartment, and includes:
      an outer container part which defines an appearance of the storage container and has an opening,
      a lid which opens and closes the opening of the outer container part,
      an inner container part which is set in the outer container part, and
      an air passage formed between the inner container part and the outer container part.

18. The refrigerator according to claim 17, wherein the air passage insulates the inner container part so as to maintain the inner container part with a higher internal temperature than that of the storage compartment.

19. The refrigerator according to claim 17, wherein the inner container part is removably set in the outer container part, and comprises a bottom plate having a plurality of discharging holes and projections which are formed on areas around the discharging holes.

20. The refrigerator according to claim 17, wherein the refrigerator is a kimchi refrigerator.

* * * * *

UNITED STATES PATENT AND TRADEMARK OFFICE
CERTIFICATE OF CORRECTION

PATENT NO.     : 6,615,607 B1  
DATED          : September 9, 2003  
INVENTOR(S)    : Sun-Gyou Lee It is certified that error appears in the above-identified patent and that said Letters Patent is hereby corrected as shown below:

<u>Title page,</u>
Item [75], Inventor, change "Kwangu" to -- Kwangju --.

Signed and Sealed this

Ninth Day of December, 2003

JAMES E. ROGAN
*Director of the United States Patent and Trademark Office*